United States Patent
Kanda

(10) Patent No.: US 10,112,626 B2
(45) Date of Patent: Oct. 30, 2018

(54) RAIL VEHICLE

(71) Applicant: KABUSHIKI KAISHA TOSHIBA, Minato-ku, Tokyo (JP)

(72) Inventor: Masahiko Kanda, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 253 days.

(21) Appl. No.: 14/632,873

(22) Filed: Feb. 26, 2015

(65) Prior Publication Data

US 2015/0166082 A1 Jun. 18, 2015

Related U.S. Application Data

(63) Continuation of application No. PCT/JP2013/001585, filed on Mar. 12, 2013.

(30) Foreign Application Priority Data

Sep. 26, 2012 (JP) ................................. 2012-212478

(51) Int. Cl.
*B61D 27/00* (2006.01)
*B61C 17/04* (2006.01)

(52) U.S. Cl.
CPC .......... *B61D 27/0018* (2013.01); *B61C 17/04* (2013.01); *Y02T 30/42* (2013.01)

(58) Field of Classification Search
CPC ...... B61D 27/0018; B61C 17/04; Y02T 30/42
USPC ....................................................... 454/83, 84
See application file for complete search history.

(56) References Cited

U.S. PATENT DOCUMENTS

| | | | | |
|---|---|---|---|---|
| 2,709,967 A * | 6/1955 | Dilworth | .................. | B61C 5/02 105/35 |
| 3,862,549 A * | 1/1975 | Fernandes | .......... | B60H 1/00371 165/42 |
| 4,774,877 A * | 10/1988 | Halliez | .............. | B61D 27/0018 454/112 |
| 5,389,035 A * | 2/1995 | Lshida; Takeshi | ......................... | B61D 27/0018 454/115 |
| 6,238,282 B1 * | 5/2001 | Kindel | ............... | B60H 1/00564 454/84 |

(Continued)

FOREIGN PATENT DOCUMENTS

DE 102009031237 A1 1/2011
DE 102010062647 A1 6/2012

(Continued)

OTHER PUBLICATIONS

Extended European Search Report dated Apr. 19, 2016, issued in counterpart European Application No. 13841037.8.

(Continued)

*Primary Examiner* — Gregory Huson
*Assistant Examiner* — Dana Tighe
(74) *Attorney, Agent, or Firm* — Holtz, Holtz & Volek PC

(57) ABSTRACT

A rail vehicle includes a plurality of items of equipment provided within a compartment, an air-conditioner that conditions air flowing within the items of equipment or within a housing that accommodates the items of equipment, and a duct that delivers air between the air-conditioner and the items of equipment and having a portion extending within the compartment in a forward/rearward direction of a vehicle, in a position close to a wall of the compartment.

5 Claims, 10 Drawing Sheets

(56) References Cited

U.S. PATENT DOCUMENTS

| | | | |
|---|---|---|---|
| 9,180,891 B2 * | 11/2015 | Van Polen | ................ B61C 5/02 |
| 2009/0320715 A1 | 12/2009 | Morita et al. | |
| 2013/0252527 A1 | 9/2013 | Tscheng et al. | |

FOREIGN PATENT DOCUMENTS

| | | |
|---|---|---|
| DE | 102010062660 A1 | 6/2012 |
| EP | 625456 A1 | 11/1994 |
| EP | 1792762 A1 | 6/2007 |
| EP | 2127991 A1 | 12/2009 |
| JP | 51127514 U | 10/1976 |
| JP | 55125863 U | 9/1980 |
| JP | 60255570 A | 12/1985 |
| JP | 63089874 U | 6/1988 |
| JP | 05069824 A | 3/1993 |
| JP | 2009234310 A | 10/2009 |
| JP | 2009234546 A | 10/2009 |
| JP | 2010069919 A | 4/2010 |

OTHER PUBLICATIONS

Japanese Office Action (and English translation thereof) dated Aug. 25, 2015, issued in counterpart Japanese Application No. 2012-212478.
Japanese Office Action dated Aug. 25, 2015, issued in counterpart Japanese Application No. 2012-212478.
International Search Report (ISR) dated Jun. 18, 2013 issued in International Application No. PCT/JP2013/001585.
Indian Office Action dated Apr. 13, 2018 issued in counterpart Indian Application No. 1666/DELNP/2015.

* cited by examiner

RAIL VEHICLE

CROSS REFERENCE TO RELATED APPLICATION

This is a Continuation of PCT Application No. PCT/JP2013/001585, filed on Mar. 12, 2013, which is based upon and claims the benefit of priority from the prior Japanese Patent Application No. 2012-212478, filed on Sep. 26, 2012, the entire contents of which are incorporated herein by reference.

FIELD

Rail vehicles are previously known in which a main conversion device or power conversion device or the like is cooled by air (air or the atmosphere). An example of such a rail vehicle is disclosed in Laid-open Japanese Patent Application Number Tokkai 2010-69919 (hereinafter referred to as Patent Reference).

BACKGROUND

In conventional rail vehicles, the layout of temperature control (temperature regulation) was often altered in accordance with the shape and disposition of the various items of equipment such as the main converters carried in each rail vehicle as a whole.

Thus it would be desirable to be able to achieve temperature regulation of the various items of equipment or the equipment provided in the housing irrespective of the position in which the plurality of items of equipment are installed in the rail vehicle.

A rail vehicle according to an embodiment of the present invention comprises: equipment, an air conditioner and a duct. A plurality of items of equipment are provided within a compartment. The air-conditioner conditions the air that is flowing within the items of equipment or within a housing in which the equipment is accommodated. The duct feeds air between the air-conditioner and the equipment and comprises a portion that extends along the forward/rearward direction of the vehicle in a position adjacent to the wall of the compartment, within this compartment.

DETAILED DESCRIPTION

Similar structural elements are included in a plurality of embodiments, which are described by way of example below. Accordingly, these similar structural elements are given the same reference symbols in order to avoid repeated description. Also, for convenience, in the various Figures, arrows are attached to indicate direction. FR represents forwards in the forward/rearward direction of the vehicle; LH represents the left-hand side in the width direction of the vehicle (i.e. rightwards towards the direction of forward travel of the vehicle); and UP represents the upwards direction of the vehicle. It should be noted that forwards and rearwards may be interchanged, depending on the direction of forward travel.

First Embodiment

Figure 1:
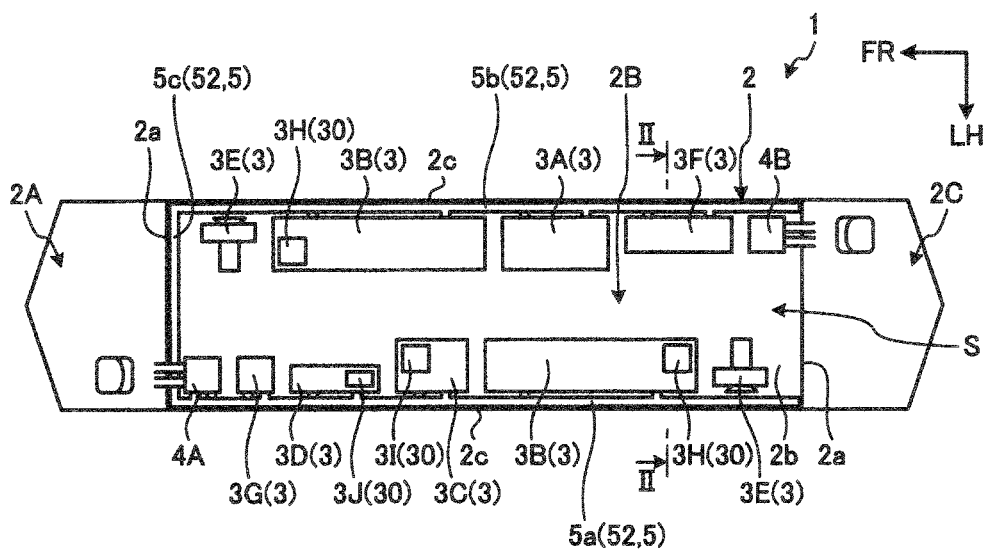
FIG. 1 is a diagrammatic plan view showing an example of the internal layout of a rail vehicle according to a first embodiment.

In the present embodiment shown in FIGS. 1 to 5, as one example shown in FIG. 1, a plurality of compartments 2A to 2C (in this embodiment, by way of example, three compartments) are provided in the car body 2 of a rail vehicle 1 (which could be a locomotive or an electric vehicle). The compartment 2A is provided at the end on one side in the forward/rearward direction of the vehicle (in this embodiment, byway of example, on the front side), and the compartment 2C is provided at the end on the other side in the forward/rearward direction of the vehicle (in this embodiment, by way of example, on the rear side). The compartment 2B is positioned between the compartment 2A and the compartment 2C. The compartment 2B is longer (wider) in the forward/rearward direction of the vehicle than the compartments 2A and 2C. Also, the compartments 2A to 2C are respectively divided by walls 2a (partitions). The walls 2a are positioned on both sides of the compartment 2B in the forward/rearward direction of the vehicle. The walls 2a extend in the vehicle width direction and in the vertical direction. The walls 2a are substantially flat rectangular-shaped and plate-shaped. Also, irregularities, apertures, doors and reinforcing members and the like are provided in the wall 2a. The compartments 2A, 2C are crew rooms (operation room, control room, driver room, conductor room) occupied by the operator (crew) etc. The compartment 2B is an equipment room (machinery room) where equipment 3, 30 etc is provided.

Also, in this embodiment, as one example, as shown in FIG. 1, the equipment 3 provided in the compartment 2B comprises for example a special high-voltage equipment frame 3A or main converter 3B, an auxiliary power source device 3C, an auxiliary frame 3D, a main blower 3E, brake control equipment 3F, and a safety device 3G.

Also, within the housing 3c (casing, accommodating section, box, frame, space, see FIG. 2) of the main converter 3B, there is accommodated a control unit 3H (equipment 30) of this main converter 3B. A control unit 3I (equipment 30) of the auxiliary power source device 3C is accommodated within the housing 3c of this auxiliary power source device 3C. Also, a vehicle control device 3J (equipment 30) is accommodated within the housing 3c of the auxiliary frame 3D. The air-conditioner 4A conditions (regulates) the air within the compartment 2A. The air conditioner 4B conditions the air within the compartment 2C. Also, the air conditioner 4A conditions the air which is delivered to the equipment 3 and that flows in the space 3b (see FIG. 2) within the housing 3c of this equipment 3. In other words, the air-conditioner 4A is shared for conditioning the air within the compartment 2A (second compartment) and for conditioning (conditioning of the environment surrounding the equipment 30) of the air which is delivered to the equipment 3 in the compartment 2B and that flows in the space 3b within the housing 3c of this equipment 3. It should be noted that, although, within the air-conditioner 4A, the temperature regulation sections (such as for example a cooling section or heating section, not shown) for the compartment 2A and for the items of equipment 3, 30 are shared, no mixture of air takes place there. Specifically, in the interior of the air-conditioner 4A, the route taken by the air directed into the compartment 2A and the route taken by the air directed to the equipment items 3, 30 are isolated from each other. It should be noted that the equipment 3 is not restricted to that described above. The equipment 3 may include various types of device, such as for example electrical equipment or electronic equipment, a prime mover (internal combustion engine), a motor, and a storage battery (secondary battery).

Also, the temperature of the components in the housing 3c (electrical components, electronic components, heating portions) and equipment 30 accommodated in the housing 3c is regulated by means of the conditioned air flowing in the housing 3c of the equipment 3. As the equipment 30 provided in the housing 3c of the equipment 3, apart from the control units 3H, 3J (control circuit boards) described above and vehicle control device 3J, there may be provided for example other control units (control circuit boards, units, electronic circuits) or circuit board assemblies, circuit boards, relays, switches, contactors, inverters, converters, power conversion units, capacitors, storage batteries (secondary batteries), electrical components and electronic components. It should be noted that there is no need to construct individual housings 3c corresponding to individual items of equipment 30. Although not shown, an arrangement could be adopted in which, corresponding to the plurality of items of equipment 30, a shared housing 3c is constituted for the arrangement of this plurality of items of equipment 30 within the housing 3c; air is introduced into the interior of this housing 3c; and conditioned air is blown into the this plurality of items of equipment 30.

Figure 2:
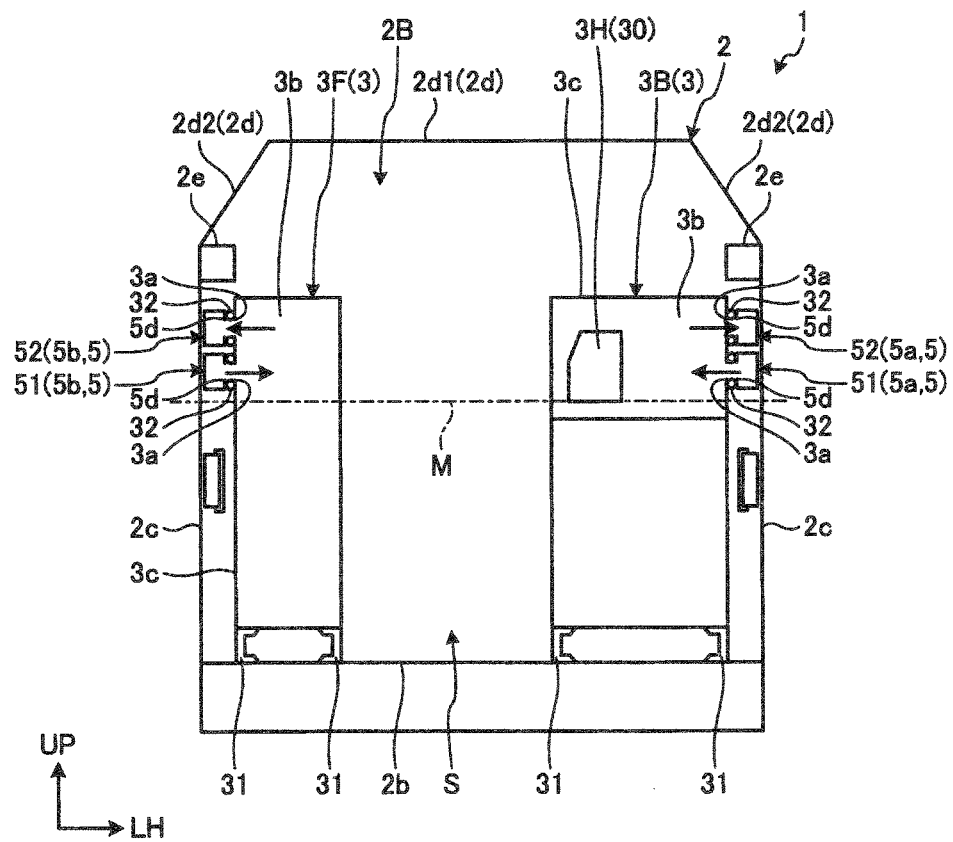
FIG. 2 is a diagrammatic cross-sectional view along the line II-II of FIG. 1 of an example of a rail vehicle according to the first embodiment.

Also, an arrangement could be adopted in which conditioned air is blown onto some of the items of equipment 30, of the plurality of items of equipment 30 accommodated in this housing 3c, but conditioned air is not blown onto other items of equipment 30. Also, as shown in FIG. 2, it could be arranged to introduce conditioned air into part of the housing 3c (i.e. to restrict the region in the housing 3c to which conditioned air is supplied), to condition the flow of air within the housing 3c, or to provide a construction or shape of the example the wall 3d or other portions within the housing 3c to achieve this effect. The items of equipment 3, 30 may be items of equipment that require temperature regulation. Also, in this embodiment, as one example, the air conditioned in the air-conditioner 4A is fed to the items of equipment 3, 30 through a delivery duct 51 (delivery portion, duct 5, see FIG. 2). Also, the air that is allowed to flow within the equipment 3 (housing 3c) is returned to the air conditioner 4A through a return duct 52 (return portion, duct 5). Specifically, in this embodiment, as one example, the air for the items of equipment 3, 30 (within the housing 3c) is unlikely to become contaminated, since it is circulated through exclusive-use ducts 5.

Also, in this embodiment, as one example, as shown in FIG. 1 and FIG. 2, the compartment 2B is enclosed by a wall 2b (bottom wall, floor wall, lower wall), two walls 2c (sidewalls) and a wall 2d (ceiling wall, top wall). FIG. 2 is a diagrammatic cross-sectional view along the line II-II of FIG. 1.

The wall 2b is positioned below the compartment 2B. The wall 2b extends along the vehicle forward/rearward direction and along the vehicle width direction. Also, the wall 2b is substantially flat rectangular-shaped and plate-shaped. The walls 2c are positioned on both sides of the compartment 2B in the vehicle width direction. The walls 2c extend along the vehicle forward/rearward direction and the vertical direction. Also, the walls 2c are substantially flat rectangular-shaped and plate-shaped. The wall 2d has a central section 2d1 and two end sections 2d2. The central section 2d1 is positioned on the upper side of the compartment 2B and in the central section thereof in the vehicle width direction. The central section 2d1 extends in the vehicle forward/rearward direction and the vehicle width direction. The central section 2d1 is substantially flat rectangular-shaped and plate-shaped. The end section 2d2 is positioned on the upper side of the compartment 2B and between the central section 2d1 and the walls 2c at both ends in the vehicle width direction. The end section 2d2 extends in the forward/rearward direction of the vehicle. The end section 2d2, when FIG. 2 is viewed in front elevation, extends in an inclined upwards direction towards the inside in the vehicle width direction, going upwardly. Also, the end section 2d2 is substantially flat rectangular-shaped and plate-shaped. In the walls 2b, 2c and 2d, there are able to be provided for example irregularities or apertures, doors and reinforcing members. The walls 2b, 2c and 2d can be constructed in a suitably divided fashion and the divisions of the walls 2b, 2c and 2d can be suitably altered. Also, within the compartment 2B, there is provided a frame 2e that functions as for example pillars or beams or a skeleton. The frame 2e is provided extending along the forward/rearward direction of the vehicle, the vertical direction and the vehicle width direction. The frame 2e may have a hollow (closed cross-section) or solid ("solid", in contrast to "hollow" means that the central portion is not hollowed out) cross-sectional shape.

Also, in this embodiment, as one example, as shown in FIG. 2, items of equipment 3 (housings 3c) are installed, by means of mounting fittings 31 or the like, on the wall 2b. Also, as shown in FIG. 1 and FIG. 2, the items of equipment 3 (housings 3c) are arranged closer to (in the vicinity of or adjacent to) the wall 2c, of the two sides in the vehicle width direction; in this way, a space S is provided between one item of equipment 3 (housing 3c) and another item of equipment 3 (housing 3c); this space S constitutes a working space or a passage whereby workers (operators) or crew etc can pass.

Also, in this embodiment, as one example, as shown in FIG. 1 and FIG. 2, the duct 5 comprises: a first portion 5a (extension, first extension), and a second portion 5b (extension, second extension) and a third portion 5c (intermediate portion). The first portion 5a extends along the forward/rearward direction of the vehicle on one side in the vehicle width direction of the compartment 2B (in the case of this embodiment, as one example, the left-hand side). The first portion 5a is positioned adjacent to the wall 2c at the end in the width direction on the upper side from the central region M in the vertical direction of the compartment 2B (or upper side from the central region in the vertical direction of the wall 2c) i.e. at the upper side of the compartment 2B and at the corner on one side in the vehicle width direction. Also, the first portion 5a extends along the upper edge of the wall 2c. The second portion 5b extends along the forward/rearwards direction of the vehicle on the other side in the vehicle width direction of the compartment 2B (in this embodiment, as one example, the right-hand side). The second portion 5b is positioned adjacent to the wall 2c at the end in the vehicle width direction on the upper side from the central region M in the vertical direction of the compartment 2B (or on the upper side from the central region in the vertical direction of the wall 2c) i.e. at the upper side of the compartment 2B and in the corner on the other side in the vehicle width direction. Also, the second portion 5b extends along the edge on the upper side of the wall 2c. The third portion 5c extends along the vehicle width direction on one side (in this embodiment, as one example, the front side) of the compartment 2B in the forward/rearwards direction of the vehicle. Also, although not shown, the third portion 5c is positioned on the upper side from the central region M in the vertical direction of the compartment 2B (or the upper side from the central region in the vertical direction of the wall 2a). The third portion 5c bridges the first portion 5a and the second portion 5b. Also, the third portion 5c links the first portion 5a and the second portion 5b. It should be noted that, while, in FIG. 1, only the return duct 52 is shown, the delivery duct 51 and the return duct 52 are respectively provided with a first portion 5a, a second portion 5b and a third portion 5c. Also, in this embodiment, as one example, the delivery duct 51 and return duct 52 communicate through the interior of the air conditioner 4A or the interior of the equipment 3 (housings 3c), but are not in direct communication. Also, the heat insulating properties (heat shielding ability) of the duct 5 are improved by for example constructing the duct of material of high heat insulating properties, provision of a heat insulating layer, provision of an air layer, or by heat insulation treatment. Also, in this embodiment, as one example, the duct 5 has a substantially rectangular-shaped closed cross-sectional shape, but could have another closed cross-sectional shape (such as for example a circular shape).

Also, in this embodiment, as one example, as shown in FIG. 2, in the case of the first portion 5a and second portion 5b thereof, respectively extending along the wall 2c, the return duct 52 is positioned above the delivery duct 51. Also, although not shown, even in the case of the third portion 5c along the wall 2a, the return duct 52 is positioned above the delivery duct 51. The temperature of the air of the return duct 52 is often higher than the temperature of the air of the delivery duct 51, since the air of the return duct 52 is heated by the items of equipment 3 and 30. In this regard, in this embodiment, since the return duct 52 is positioned above the delivery duct 51, the delivery duct 51 is unlikely to be affected by the heat of the return duct 52 i.e. is unlikely to be heated thereby. Also, when the air in the space 3b within the equipment 3 (housings 3c) is heated, this heated air can easily escape to the return duct 52 that is positioned above the items of equipment 3.

Also, in this embodiment, as one example, as shown in FIG. 2, at least part of the equipment 3 (housing 3c) is provided adjacent to the duct 5, and an aperture portion 3a provided in the equipment 3 and an aperture portion 5d (aperture) provided in the duct 5 are mutually opposite and superimposed in the vehicle width direction. Leakage of gases or permeation of liquids etc between the aperture portion 3a and the aperture portion 5d is suppressed by sealing by means of a sealing member 32 (such as for example an O-ring or packing or a gasket). In this embodiment, as one example, a construction is adopted such that sealing by the sealing member 32 is improved by clamping of the sealing member 32 between the equipment 3 and the duct 5 by mounting the equipment 3 on the car body 2 (wall 2b) closer to the side of the duct 5 (i.e. the side of the wall 2c), thereby raising the face pressure of this sealing member 32. In this way, in this embodiment, as one example, sealing performance between the equipment 3 and the duct 5 can easily be improved by a comparatively straightforward construction and comparatively easy mounting operation.

Figure 3:
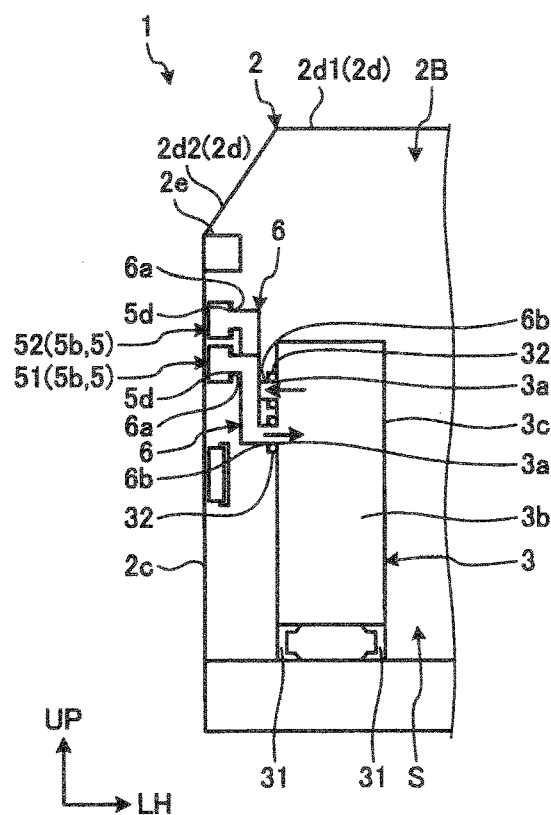
FIG. 3 is a partial diagrammatic cross-sectional view of an example of a rail vehicle according to the first embodiment, at a position different from that of FIG. 2.

Also, in this embodiment, as one example, as shown in FIG. 3, the height of at least part of the item of equipment 3 (the housing 3c) is lower than the position of the duct 5. FIG. 3 is a partial, diagrammatic cross-sectional view at a position different from that of FIG. 2.

In this case, a connecting duct 6 is interposed between the duct 5 and the item of equipment 3. The connecting duct 6 is fixed to the duct 5 by fixing using a fixing element (such as for example a screw) or coupling (for example welding deposition, bonding or welding). The aperture portion 6a on one side of the connecting duct 6 and the aperture portion 5d of the duct 5 are superimposed, and the aperture portion 6b on the other side of the duct 6 and the aperture portion 3a of the equipment 3 are superimposed. The connecting portions of the connecting duct 6 and the equipment 3 are sealed by the sealing member 32 or the like. Thus, in the construction of FIG. 3, in the same way as in the construction of FIG. 2, sealing by the sealing member 32 is improved by clamping of the sealing member 32 between the equipment 3 and the duct 6 by mounting the equipment 3 on the car body 2 (wall 2b) closer to the side of the duct 5, thereby raising the face pressure of this sealing member 32. In this way, in this embodiment, as one example, sealing performance between the equipment 3 and the duct 6 can easily be improved by a comparatively straightforward construction and comparatively easy mounting operation. It should be noted that the connecting duct 6 could be employed even in the case where the aperture portion 3a of the equipment 3 and the aperture portion 5d of the duct 5 are offset in the forward/rearward direction of the vehicle.

Figure 4:
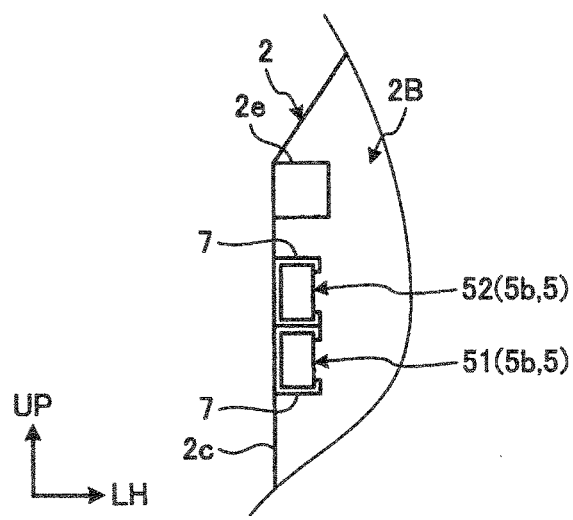
FIG. 4 is a partial diagrammatic cross-sectional view of a rail vehicle according to the first embodiment, at a position different from that of FIG. 2 and FIG. 3.

Also, in this embodiment, as one example, as shown in FIG. 4, the duct 5 could be mounted by means of a mounting element 7 on the wall 2c (or wall 2a or wall 2b or wall 2d). FIG. 4 is a partial diagrammatic cross-sectional view at a position different from that of FIG. 2 and FIG. 3.

A plurality of mounting elements 7 are arranged with a separation in the forward/rearward direction of the vehicle. It should be noted that the construction of FIG. 4 merely represents one example, and the duct 5 could be fixed by means of fixing elements (such as for example screws) to the walls 2a to 2d etc. Also, a heat insulating member may be interposed between the duct 5 and walls 2a to 2d or frame 2e.

Figure 5:
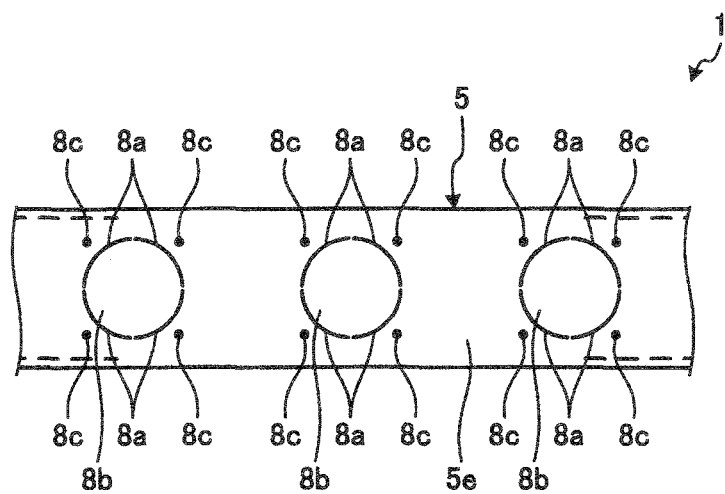
FIG. 5 is a side view, seen from inside the compartment, of part of a duct employed in an example of a rail vehicle according to the first embodiment.

Also, in this embodiment, as one example, as shown in FIG. 5, a plurality of aperture-forming-capable portions 8 may be provided in the wall section 5e of the compartment 2B on the inside of the duct 5. FIG. 5 is a side face view seen from inside the compartment, of part of a duct that is employed in one example of a rail vehicle according to the first embodiment.

Figure 6:
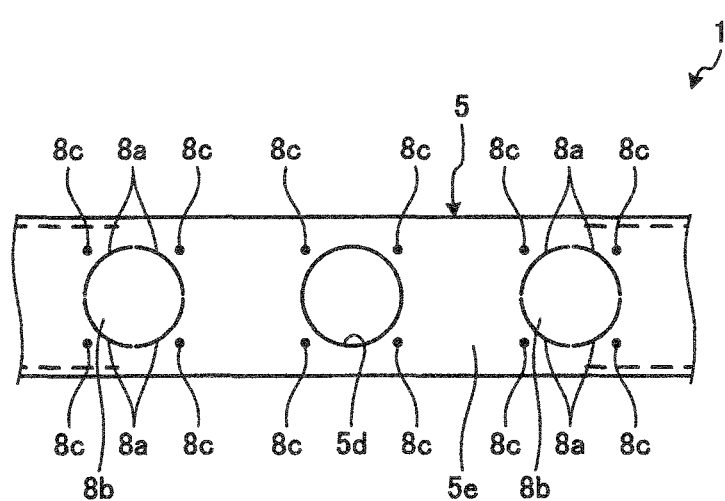
FIG. 6 is a view showing the condition in which an aperture portion is formed in one of sections where aperture formation in the duct of FIG. 5 is possible.

In an aperture-forming-capable portion 8, there are provided a plurality (in this embodiment, by way of example, four) of recesses 8a (recessed grooves) of arcuate shape along a circle. The thickness of the portion where the recesses 8a are provided is less than the thickness of other portions (ordinary portions). By pressing the plurality of recesses 8a or the inside of the plurality of recesses 8a with the fingers or a tool, the operator excises a region 8b (part of the cover section or wall section 5e) on the inside of these recesses 8a and can thereby form an air aperture portion 5d of prescribed shape (size) as shown in FIG. 6. The region 8b enclosed by the plurality of recesses 8a constitutes one example of a weakened portion (thin portion). The plurality of aperture-forming-capable portions 8 are provided with a fixed separation along the longitudinal direction of the duct 5. Specifically, in this embodiment, as one example, even if the position of arrangement of the items of equipment 3 (housing 3c) is changed, a path for the air between the duct 5 and the item of equipment 3 can easily be constituted by providing the plurality of aperture-forming-capable portions 8 in a dispersed manner from the front side to the rear side in the forward/rearward direction of the vehicle. In other words, in this embodiment, as one example, the degrees of freedom of the layout of the items of equipment 3 can easily be increased.

As described above, with this embodiment, as one example, a rail vehicle 1 comprises a duct 5 within the compartment 2, having a first portion 5a and second portion 5b that feeds air between the air-conditioner 4A and the items of equipment 3, 30 and that extends along the forward/rearward direction of the vehicle in a position close to the wall 2c of the compartment 2 in question. In this way, in this embodiment, as one example, irrespective of the position of the items of equipment 3, 30 provided within the compartment 2B in the forward/rearward direction of the vehicle, air that is conditioned by the air conditioner 4A can be applied to the various items of equipment 3, 30 by utilizing the first portion 5a and the second portion 5b of the duct 5. Also, in this embodiment, as one example, more efficient regulation of temperature or humidity etc within the items of equipment 3 can be achieved irrespective of the position in which these are respectively installed (position in the forward/rearward direction of the vehicle). In this way, as one example, the degrees of freedom of the layout of the items of equipment 3 within the compartment 2B can be easily raised, irrespective of the amount of heat etc generated by these items of equipment 3. Also, in this embodiment, as one example, the duct 5 can easily be installed within the compartment 2B by utilizing the walls 2c and/or the frame 2e or the like. In this way, with this embodiment, as one example, a rail vehicle 1 can easily be constituted as a standardized vehicle. Also, in this embodiment, as one example, in regard to equipment 3 where equipment 30 is accommodated within the housing 3c, replacement (ventilation or scavenging) of air within the housing 3c (space 3b) by conditioned air, or regulation of temperature or humidity within the housing 3c and regulation etc of the temperature of the equipment 30 can be performed. In addition, in some cases the equipment 3, 30 may become difficult to operate in a high-temperature environment. In contrast, the air-conditioner 4A can operate in a high-temperature environment. Accordingly, in this embodiment, as one example, in a high-temperature environment the air-conditioner 4A is operated so that the ambient temperature of the items of equipment 3, 30 is lowered by utilizing this air-conditioner 4A: in this way, these items of equipment 3, 30 can be more rapidly brought into a condition in which they can easily be operated. Also, in a low-temperature environment, the ambient temperature of the items of equipment 3, 30 is raised by utilizing the air-conditioner 4A, so that these items of equipment 3, 30 can be more rapidly brought into a condition in which they can easily be operated. Consequently, in this embodiment, as one example, in the components of the items of equipment 3 or the items of equipment 30, the time or cost involved in use of components of high heat-withstanding ability, or of taking countermeasures to withstand heat, or of performing heat-insulation measures can be easily reduced.

Also, in this embodiment, as one example, the first portion 5a (extension) and second portion 5b (extension) are positioned at the ends in the vehicle width direction above the central region M in the vertical direction of the compartment 2B. Consequently, in this embodiment, as one example, arrangement of the duct 5 (first portion 5a and/or second portion 5b) can easily be achieved by utilizing the region of the compartment 2B at the ends thereof in the vehicle width direction and above the central region M thereof in the vertical direction, which tends to constitute a space (dead space) within the compartment 2B which is comparatively free. Consequently, in this embodiment, as one example, interference between the duct 5 and the equipment 3 (housing 3c) and/or components etc can easily be suppressed and installation of the duct 5 can easily be effected in a condition in which there are fewer difficulties (inconveniences) within the compartment 2B. Also, in this embodiment, as one example, the efficiency of utilization of the space within the compartment 2B can easily be raised. Furthermore, in this embodiment, as one example, the degrees of freedom of the layout of the items of equipment 3 (housing 3c) in the vehicle width direction can be easily raised, as a result of the fact that air can be introduced into the equipment 3 (housing 3c) from either of the first portion 5a or second portion 5b.

Also, in this embodiment, as one example, the duct 5 comprises a first portion 5a (first extension) extending along the forward/rearward direction of the vehicle on one side in the vehicle width direction of the compartment 2B and a second portion 5b (second extension) extending along the forward/rearward direction of the vehicle on the other side in the vehicle width direction of the compartment 2B; the items of equipment 3 (housing 3c) are positioned closer to one side or the other side wall 2c in the vehicle width direction of the compartment 2B and the space S between the item of equipment 3 (housing 3c) that is positioned closest to the wall 2c on one side in the vehicle width direction and the item of equipment 3 (housing 3c) that is positioned closest to the wall 2c on the other side in the vehicle width direction extends along the forward/rearwards direction of the vehicle. Consequently, in this embodiment, as one example, the space S can be utilized as a passage or operating space for passage of workers (operators) or crew etc. Also, as one example, workers (operators) can have access to items of equipment 3 on both sides in the vehicle width direction from the space S. Furthermore, as one example, in a rail vehicle 1 having an arrangement in which the space S is guaranteed in the central region in the vehicle width direction of the compartment 2B, a layout whereby conditioned air can flow into the space 3b within the plurality of items of equipment 3 arranged in the forward/rearward direction of the vehicle can be more efficiently and more easily obtained.

Also, in this embodiment, as one example, the duct 5 comprises: a delivery duct 51 (delivery portion) that delivers air from the air-conditioner 4A to the equipment 3, 30 (housing 3c) and that is provided closer to the wall 2c on one side in the vehicle width direction of the compartment 2B and that extends along the forward/rearward direction of the vehicle; and a return duct 52 (return portion) that returns air from the equipment 3, 30 (housing 3c) to the air conditioner 4A and that is provided closer to the wall 2c on one side in the vehicle width direction and that is positioned above the delivery duct 51 and that extends along the forward/rearward direction of the vehicle. In this way, with this embodiment, as one example, the delivery duct 51 is unlikely to be affected by heat from the return duct 52 i.e. is unlikely to be heated up. Also, as one example, when the air in the space 3b within the equipment 3 (housing 3c) is heated, such heated air is easily expelled from the equipment 3 (housing 3c) to the return duct 52 which is positioned thereabove.

Also, with this embodiment, as one example, the duct 5 comprises a first portion 5a (first extension) extending along the forward/rearward direction of the vehicle on one side in the vehicle width direction of the compartment 2B; a second portion 5b (second extension) extending along the forward/rearward direction of the vehicle on the other side in the vehicle width direction of the compartment 2B; and a third portion 5c (intermediate portion) that bridges the first portion 5a and the second portion 5b and that links the first portion 5a and the second portion 5b. In this way, with this embodiment, as one example, a construction in which the first portion 5a and the second portion 5b are linked can be obtained by a comparatively straightforward construction. In this way, as one example, conditioned air can be supplied from a single air conditioner 4A to a first portion 5a and second portion 5b that extend along the forward/rearwards direction of the vehicle respectively on both sides in the vehicle width direction within the compartment 2B, and in this way can be supplied to respective items of equipment 3, 30 that are connected with the first portion 5a and second portion 5b.

Also, in this embodiment, as one example, the air-conditioner 4A is shared by the compartment 2B and a compartment 2A (second compartment) divided from this compartment 2B and that is provided in front of or behind (in this embodiment, as one example, in front) the aforementioned compartment 2B. In this way, in this embodiment, as one example, compared with the case where the air-conditioner is provided in each of the compartments 2A and 2B, the layout of the rail vehicle 1 can be simplified and the energy efficiency can be more easily raised.

Also, in this embodiment, as one example, in the duct 5, there are provided a plurality of aperture-forming-capable portions 8 that are capable of forming air aperture portions 5d (apertures) by excising a portion thereof at recesses 8a (weakened portion). In this way, with this embodiment, as one example, an operator can comparatively easily form an aperture portion 5d linking with an aperture portion 3a of the item of equipment 3 (housing 3c), by selecting an aperture-forming-capable portion 8. In this way, as an example, the degrees of freedom of the layout of the equipment 3, 30 (housing 3c) in the compartment 2B can easily be increased.

Second Embodiment

Figure 7:
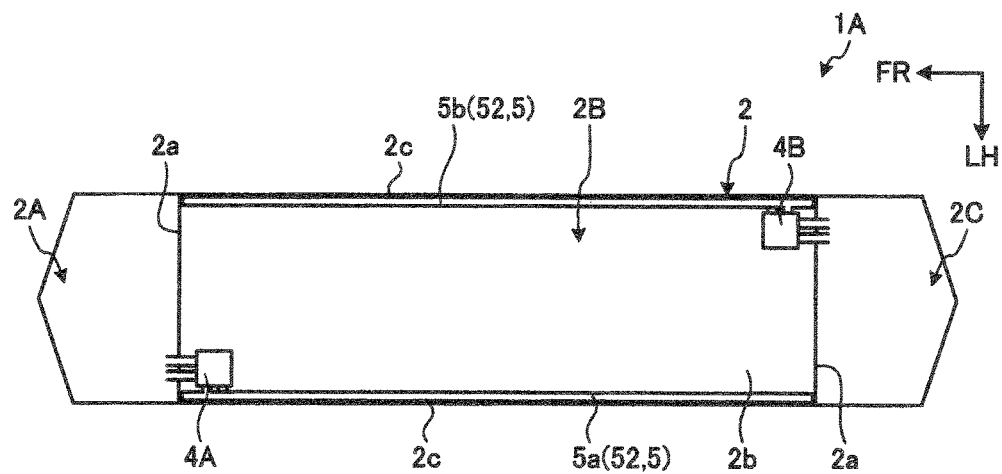
FIG. 7 is a diagrammatic plan view showing the arrangement of the air-conditioner and duct in an example of a rail vehicle according to a second embodiment.

A rail vehicle 1A according to the present embodiment shown in FIG. 7 comprises the same construction as in the case of the embodiment described above. Consequently, in this embodiment also, the same action and effects (benefits) are obtained, based on the same construction as aforementioned. It should be noted that, in FIG. 7, illustration of the items of equipment 3, 30 (housing 3c) etc. is dispensed with.

In this embodiment, the construction of the air-conditioners 4A, 4B and/or the duct 5 etc are different from in the embodiment described above. Specifically, in this embodiment, as one example, the first portion 5a and the second portion 5b of the duct 5 are mutually isolated and are not linked. Air is delivered from the air conditioner 4B to (the delivery duct 51, not shown in FIG. 7, of) the second portion 5b and the air is returned from (the return duct 52 of) the second portion 5b of the air conditioner 4B. With this embodiment, as one example, the temperature and/or humidity etc of the space 3b in the equipment 3 (housing 3c) can be more efficiently regulated by using two air-conditioners 4A, 4B. It should be noted that the air conditioner 4B could also condition the air of the compartment 2C (second compartment).

Third Embodiment

Figure 8:
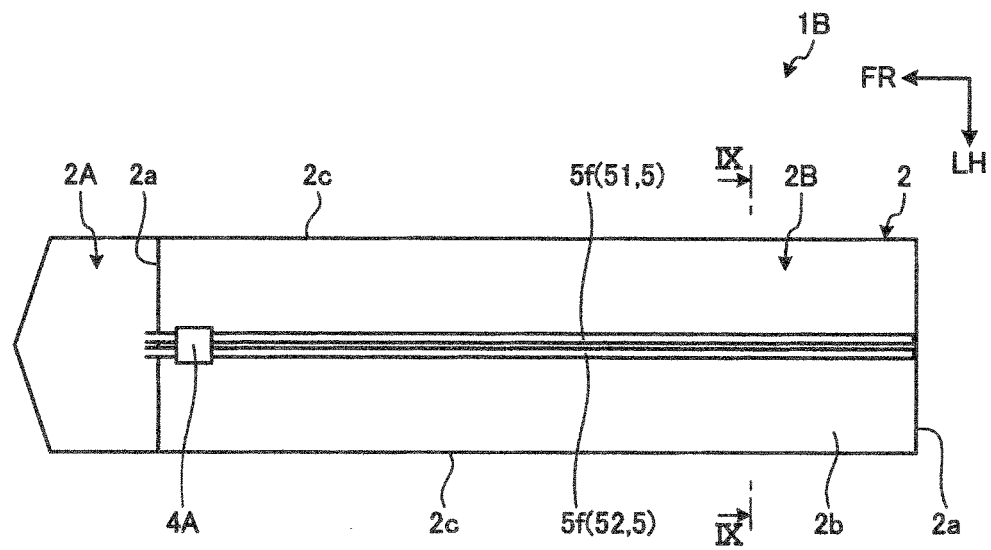
FIG. 8 is a diagrammatic plan view showing the arrangement of the air-conditioner and duct in an example of a rail vehicle according to a third embodiment.
Figure 9:
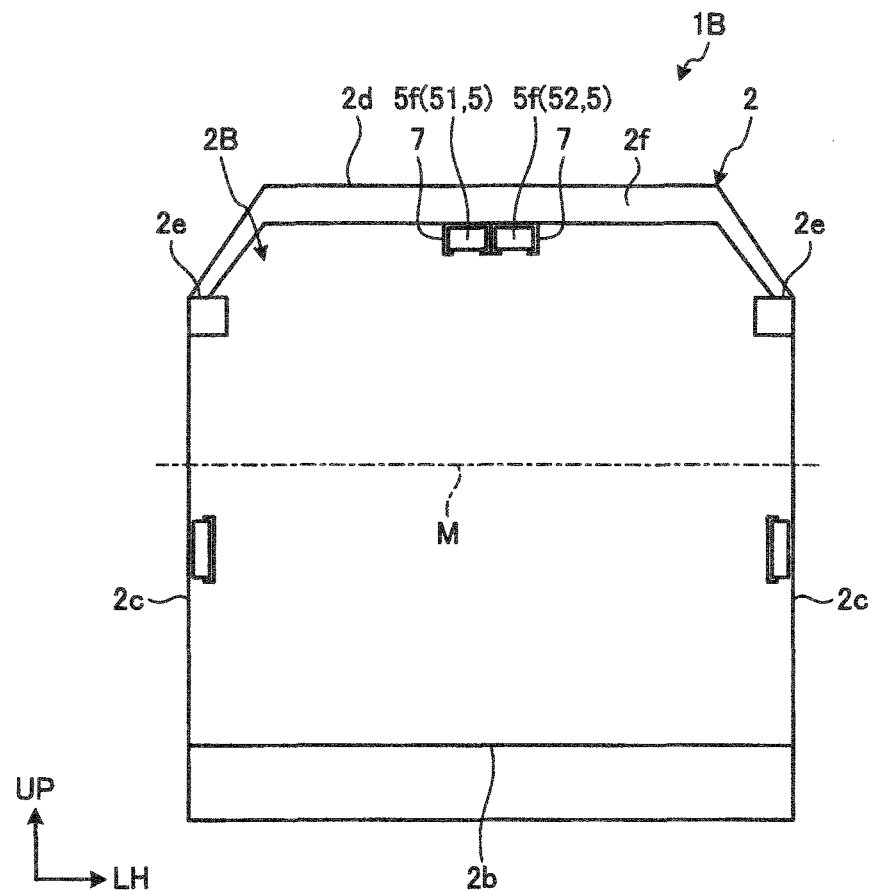
FIG. 9 is a diagrammatic cross-sectional view along the line IX-IX of FIG. 8 of an example of a rail vehicle according to the third embodiment.
Figure 10:
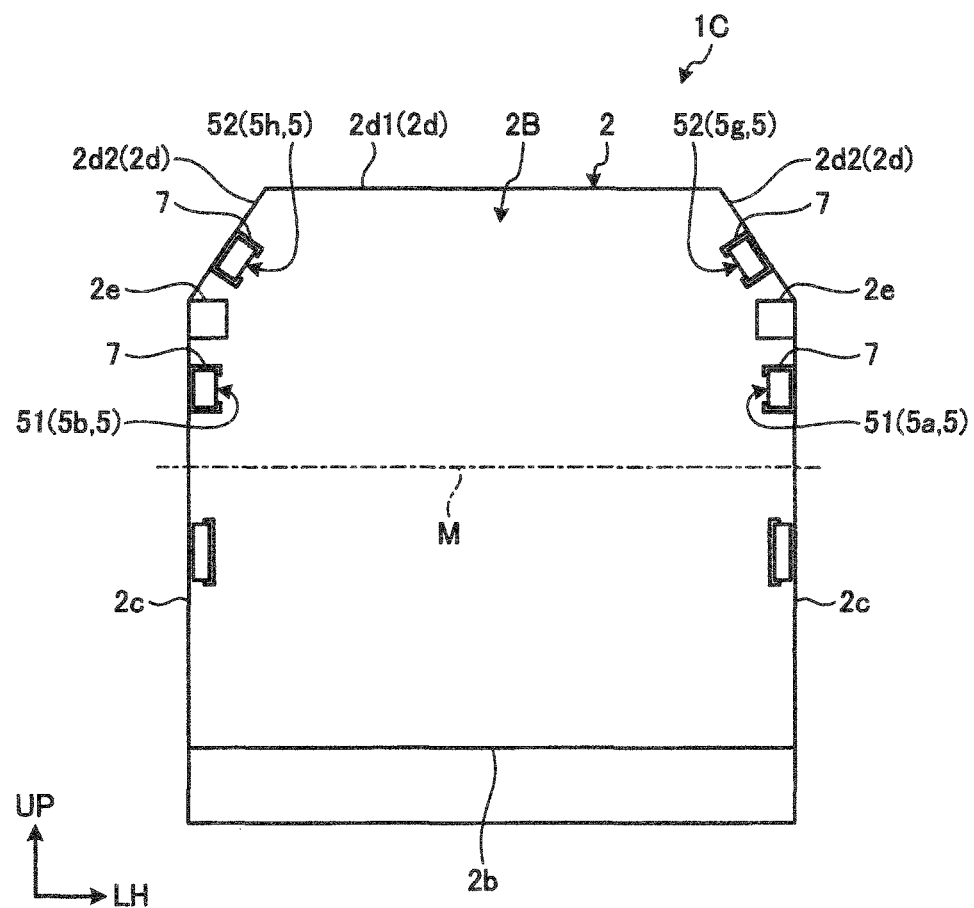
FIG. 10 is a diagrammatic cross-sectional view of an example of a rail vehicle according to a fourth embodiment.

A rail vehicle 1B according to this embodiment illustrated in FIG. 9 and FIG. 10 comprises the same construction as the embodiments described above. FIG. 9 is a diagrammatic cross-sectional view along the line IX-IX of FIG. 8 of an example of a rail vehicle according to the third embodiment.

Consequently, with this embodiment also, the same actions and results (beneficial effects) are obtained as in the case of the aforementioned identical construction. In FIG. 8 and FIG. 9, illustration of the equipment 3, 30 (housing 3c) etc. is dispensed with. In this embodiment, the construction of the duct 5 is different from that of the above embodiments. Specifically, in this embodiment, as one example, portions 5f, 5f constituting the delivery duct 51 and return duct 52 of the duct 5 are arranged in a parallel fashion at the top of the compartment 2B and at the middle thereof in the vehicle width direction, and extend along the forward/rearward (backward) direction of the vehicle. Also, in this embodiment, as one example, a frame 2f (rafter) bridging the two frames 2e is provided along the wall 2d on the upper side of the compartment 2B. The duct 5 is fixed to the frame 2f by means of a mounting element 7. In this embodiment, as one example, when the equipment 3 (housing 3c) is positioned in the middle of the compartment 2, conditioned air is easily supplied to the equipment 3, 30.

Fourth Embodiment

Figure 11:
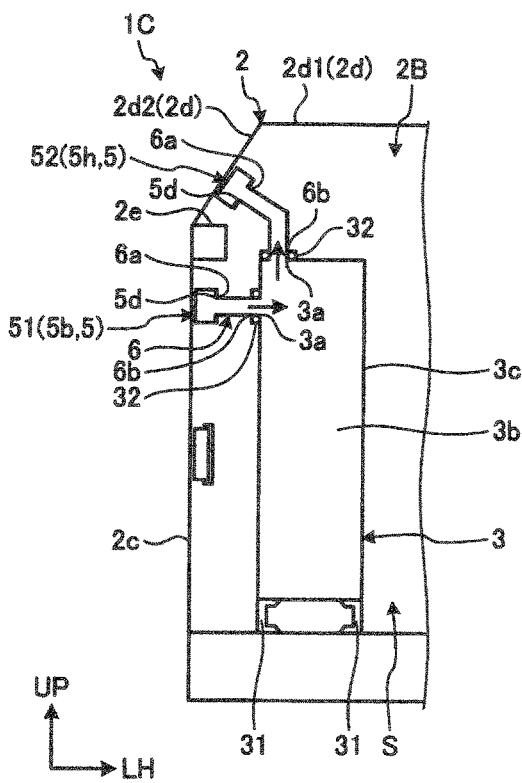
FIG. 11 is a diagrammatic cross-sectional view of the example of a rail vehicle according to a fourth embodiment at a position different from that of FIG. 10.

A rail vehicle 1C according to this embodiment illustrated in FIG. 10 and FIG. 11 comprises the same construction as the embodiments described above. Consequently, with this embodiment also, the same actions and results (beneficial effects) are obtained as in the case of the aforementioned identical construction. In FIG. 10, illustration of the equipment 3, 30 (housing 3c) etc. is dispensed with. In this embodiment, the construction of the duct 5 is different from that of the above embodiments. Specifically, in this embodiment, as one example, portions 5g, 5h constituting the return duct 52 of the duct 5 are fixed to the edge 2d2 of the wall 2d by means of a mounting element 7, at the top of the compartment 2B and on both sides in the vehicle width direction. The portions 5g, 5h extend along the forward/rearward direction of the vehicle in a position close to (adjacent, flanking) the edge 2d2. Also, in this embodiment, as one example, the connecting duct 6 is fixed to the return duct 52 (portions 5g, 5h) by fixing using a fixing element (such as for example a screw), or by coupling (for example welding deposition, bonding or welding etc). The connecting duct 6 that is fixed to the return duct 52 is pressed from above onto the equipment 3 (housing 3c). An aperture portion 6b of the connecting duct 6 and an aperture portion 3a of the item of equipment 3 are superimposed. The connecting portion of the connecting duct 6 and the item of equipment 3 are sealed by for example a sealing member 32. In this embodiment, as one example, the connecting duct 6 that is fixed with the duct 5 to the wall 2d constituting the roof is mounted on the item of equipment 3; the sealing member 32 is thereby clamped between the item of equipment 3 and the connecting duct 6: in this way, the face pressure of this sealing member 32 is increased and a construction is achieved in which sealing performance by the sealing member 32 is improved. With this embodiment, as one example, interference of the return duct 52 and the equipment 3 (housing 3c) and/or components thereof is even easier to suppress, so that the return duct 52 can easily be installed in a condition that presents even less difficulty in the compartment 2B. Also, with this embodiment, as an example, the efficiency of utilization of the space in the compartment 2B can easily be improved even further. It should be noted that the delivery duct 51 can be provided along the wall 2d or both the delivery duct 51 and the return duct 52 could be provided along the wall 2d.

Fifth Embodiment

Figure 12:
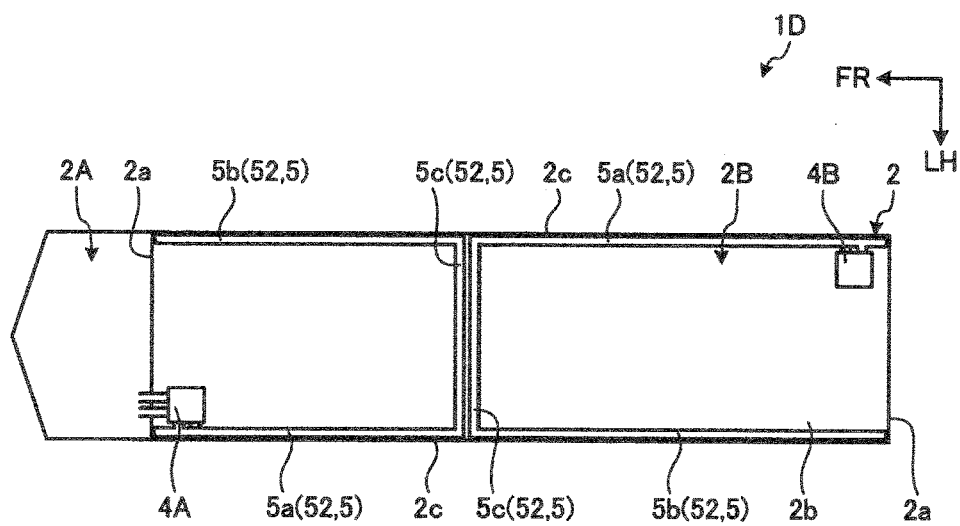
FIG. 12 is a diagrammatic cross-sectional view showing the arrangement of the air conditioner and duct of an example of a rail vehicle according to a fifth embodiment.

A rail vehicle 1D according to this embodiment illustrated in FIG. 12 comprises the same construction as the embodiments described above. Consequently, with this embodiment also, the same actions and results (beneficial effects) are obtained as in the case of the aforementioned identical construction. In FIG. 12, illustration of the equipment 3, 30 (housing 3c) etc. is dispensed with. In this embodiment, the construction of the car body 2 and the duct 5 is different from that of the above embodiments. Specifically, in this embodiment, as one example, the compartment 2C is absent and the air conditioner 4B performs conditioning of the air delivered to the equipment 3 (housing 3c) and flowing in the space 3b within the housing 3c. The air-conditioner 4A performs conditioning of the air within the compartment 2A and of the air delivered to the equipment 3, 30 (housing 3c) and flowing in the space 3b within the equipment 3 (housing 3c). Also, the air-conditioner 4A conditions the air within the equipment 3 (housing 3c) of the compartment 2B that is arranged on the front side in the forward/rearward direction of the vehicle, and the air conditioner 4B conditions the air within the equipment 3 (housing 3c) of the compartment 2B that is arranged on the rear side in the forward/rearward direction of the vehicle. The duct 5 that is linked with the air-conditioner 4A comprises: a first portion 5a that is positioned on one side in the vehicle width direction (in this embodiment, as one example, the left-hand side); a second portion 5b that is positioned on the other side in the vehicle width direction (in this embodiment, as one example, the right-hand side); and a third portion 5c extending in the vehicle width direction, that connects the end of the first portion 5a on one side (in this embodiment, as one example, the rear side) in the forward/rearwards direction of the vehicle and the end on one side of the second portion 5b in the forward/rearward direction of the vehicle, thus presenting, overall, a U-shape. Also, the duct 5 that is linked with the air-conditioner 4B comprises: a first portion 5a that is positioned on the other side in the vehicle width direction; a second portion 5b that is positioned on the one side in the vehicle width direction; and a third portion 5c extending in the vehicle width direction, that connects the end of the first portion 5a on the other side in the forward/rearwards direction of the vehicle and the end on the other side of the second portion 5b in the forward/rearward direction of the vehicle (in this embodiment, as one example, the front side), thus presenting, overall, a U-shape. With this embodiment, as one example, the temperature and/or humidity etc of the space 3b in the equipment 3 (housing 3c) can be more efficiently regulated by using two air-conditioners 4A, 4B. Also, in this embodiment, as one example, the size of the regions wherein the two air-conditioners 4A, 4B can serve the equipment 3, 30 in the compartment 2B is different. Specifically, the region that can be served by the air conditioner 4A (region surrounded by the duct 5 linked with the air-conditioner 4A) is more restricted than the region that can be served by the air conditioner 4B (region surrounded by the duct 5 linked with the air conditioner 4B). In this embodiment, the air-conditioner 4A performs conditioning of the air in the compartment 2A, so the region in which the air-conditioner 4A serves the equipment 3, 30 in the compartment 2B is more restricted than the region in which the air-conditioner 4B serves the equipment 3, 30 in the compartment 2B. Consequently, in this embodiment, as one example, the two air-conditioners 4A, 4B can be more efficiently employed.

Sixth Embodiment

Figure 13:
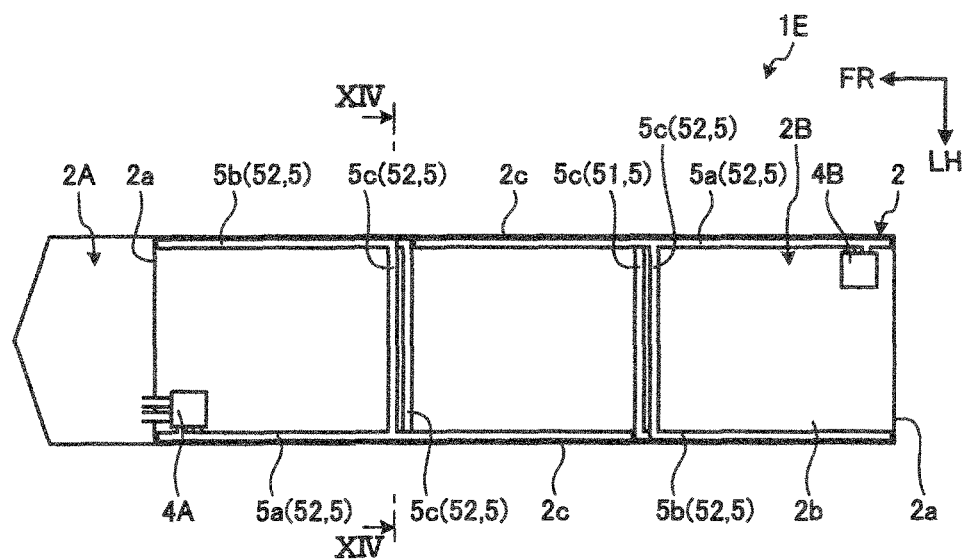
FIG. 13 is a diagrammatic plan view showing the arrangement of the air-conditioner and duct of an example of a rail vehicle according to a sixth embodiment.
Figure 14:
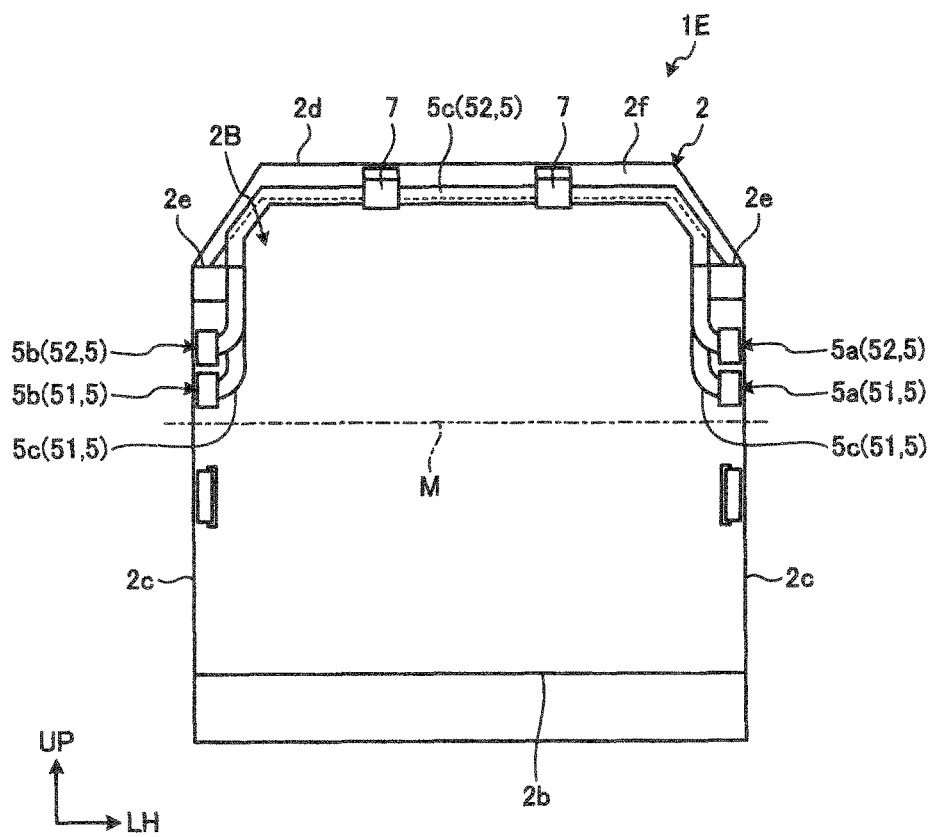
FIG. 14 is a diagrammatic cross-sectional view along the line XIV-XIV of FIG. 13, showing an example of a rail vehicle according to a sixth embodiment.

A rail vehicle 1E according to this embodiment illustrated in FIGS. 13 and 14 comprises the same construction as the embodiments described above. It may be noted that FIG. 14 is a diagrammatic cross-sectional view along the line XIV-XIV of FIG. 13.

Consequently, with this embodiment also, the same actions and results (beneficial effects) are obtained as in the case of the aforementioned identical construction. In FIGS. 13 and 14, illustration of the equipment 3, 30 (housing 3c) etc. is dispensed with. In this embodiment, the construction of the car body 2 and the duct 5 is different from that of the above embodiments. Specifically, in this embodiment, as one example, the compartment 2C is absent and the air conditioner 4B performs conditioning of the air delivered to the equipment 3 (housing 3c) and flowing in the space 3b within the housing 3c. The air-conditioner 4A performs conditioning of the air within the compartment 2A and of the air delivered to the equipment 3, 30 (housing 3c) and flowing in the space 3b within the equipment 3 (housing 3c). Also, the air-conditioner 4A conditions the air within the equipment 3 (housing 3c) of the compartment 2B that is arranged on the front side in the forward/rearward direction of the vehicle, and the air conditioner 4B conditions the air within the equipment 3 (housing 3c) of the compartment 2B that is arranged on the rear side in the forward/rearward direction of the vehicle. The duct 5 that is linked with the air-conditioner 4A comprises: a first portion 5a that is positioned on one side in the vehicle width direction (in this embodiment, as one example, the left-hand side); a second portion 5b that is positioned on the other side in the vehicle width direction (in this embodiment, as one example, the right-hand side); and a third portion 5c extending in the vehicle width direction, that connects an intermediate portion of the first portion 5a in the forward/rearward direction of the vehicle and the end of the second portion 5b on one side (in this embodiment, as one example, the rearward side) in the forward/rearward direction of the vehicle: overall, an h shape is thus constituted. Also, the duct 5 that is linked with the air-conditioner 4B comprises: a first portion 5a that is positioned on the other side in the vehicle width direction; a second portion 5b that is positioned on one side in the vehicle width direction; and a third portion 5c extending in the vehicle width direction, that connects an intermediate portion of the first portion 5a in the forward/rearward direction of the vehicle and the end of the second portion 5b on the other side (in this embodiment, as one example, the forward side) in the forward/rearward direction of the vehicle: overall, an h shape is thus constituted. With this embodiment, as one example, the temperature and/or humidity etc of the space 3b in the equipment 3 (housing 3c) can be more efficiently regulated by using two air-conditioners 4A, 4B. Also, in this embodiment, as one example, the third portion 5c of the delivery duct 51 is positioned on one side (in the forward/rearward direction of the vehicle) in the width direction of the frame 2f (in this embodiment, as one example, the rear side in the forward/rearward direction of the vehicle); and the third portion 5c of the return duct 52 is positioned on the other side in the width direction of the frame 2f. The third portion 5c is fixed to the frame 2f through the mounting element 7. In this way, in this embodiment, as one example, the third portion 5c can be arranged more easily or more efficiently.

Seventh Embodiment

Figure 15:
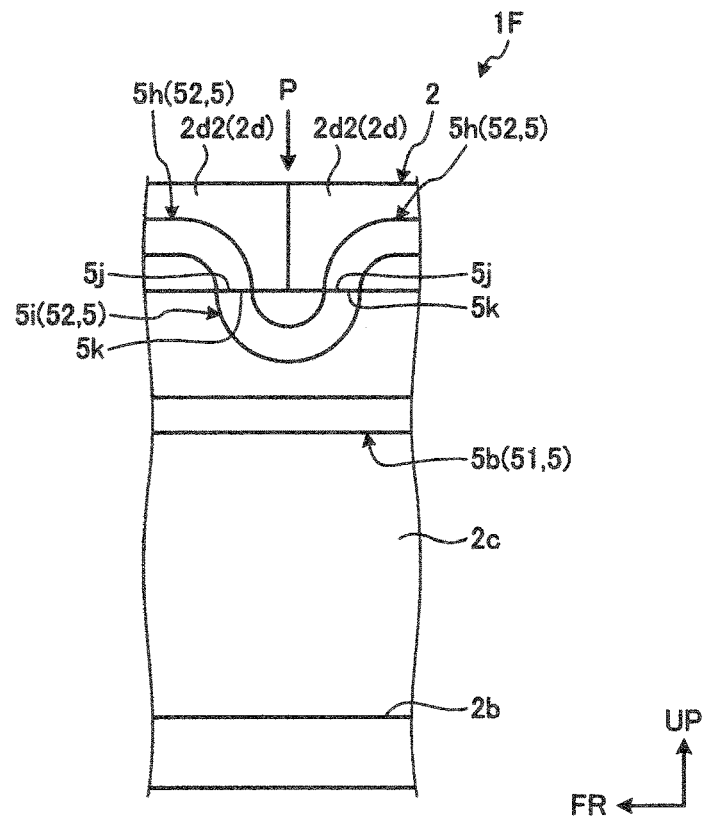
FIG. 15 is a side view seen from inside a compartment, showing part of a duct employed in an example of a rail vehicle according to a seventh embodiment.

A rail vehicle 1F according to this embodiment illustrated in FIG. 15 comprises the same construction as the embodiments described above. Consequently, with this embodiment also, the same actions and results (beneficial effects) are obtained as in the case of the aforementioned identical construction. In FIG. 15, illustration of the equipment 3, 30 (housing 3c) etc. is dispensed with. In this embodiment, the construction of the car body 2 and the duct 5 is different from that of the above embodiments. Specifically, in this embodiment, as one example, the (edge 2d2 of the) wall 2d constituting the wall where the portion 5h of the duct 5 is mounted is divided at a plurality of positions P (boundary portions). In this case, the wall 2d is placed from above on the side of the wall 2c. On the wall 2c, there are provided U-shaped portions 5i (connecting sections) linking mutually adjacent portions 5h. Each of the ends 5j (aperture portions) where the portions 5i and portions 5h are connected is open towards the top and each of the ends 5k (aperture portions) where the portions 5i and portions 5h are connected is open towards the bottom. In this way, the portions 5h and portions 5i that are provided on each wall 2d are put in communication by placing the two walls 2d from above on the wall 2c. Consequently, in this embodiment, as one example, a series of ducts 5 can be more easily constituted with the portions 5h of the ducts 5 provided on a plurality of walls linked in a comparatively easy fashion. Also, in this embodiment, as one example, a construction can easily be obtained in which overlapping connecting portions of the ends 5j, 5k are sealed (for example using O-rings, not shown). Also, in this embodiment, as one example, if frames 2f are provided corresponding to the positions P bridging the top of the compartment 2B in the vehicle width direction, a construction can easily be obtained in which interference of the ducts 5 and frames 2f is suppressed by enabling the ducts 5 to bypass the frames 2f.

Eighth Embodiment

Figure 16:
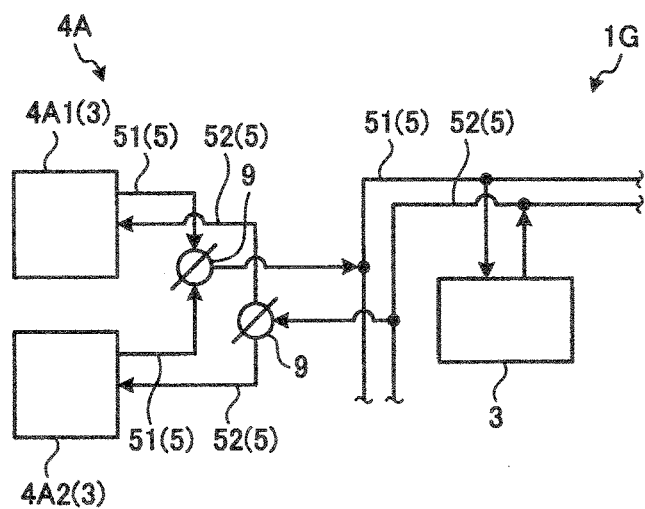
FIG. 16 is a layout diagram of an air conditioning system of equipment employed in an example of a rail vehicle according to an eighth embodiment.

A rail vehicle 1G according to this embodiment illustrated in FIG. 16 comprises the same construction as the embodiments described above. Consequently, with this embodiment also, the same actions and results (beneficial effects) are obtained as in the case of the aforementioned identical construction. In this embodiment, the construction of the air conditioner 4A and the duct 5 is different from that of the above embodiments. Specifically, in this embodiment, as one example, the air-conditioner 4A comprises for example: a cooling section 4A1 (cooling device) and heating section 4A2 (heating device) and a changeover section 9 (damper). The changeover unit 9 can change over between a condition in which the cooling unit 4A1 is in communication with the duct 5 and a condition in which the heating section 4A2 is in communication with the duct 5. In this way, in this embodiment, as one example, by changing over the changeover section 9, the air-conditioner 4A can be utilized as a cooling section or can be utilized as a heating section.

Ninth Embodiment

Figure 17:
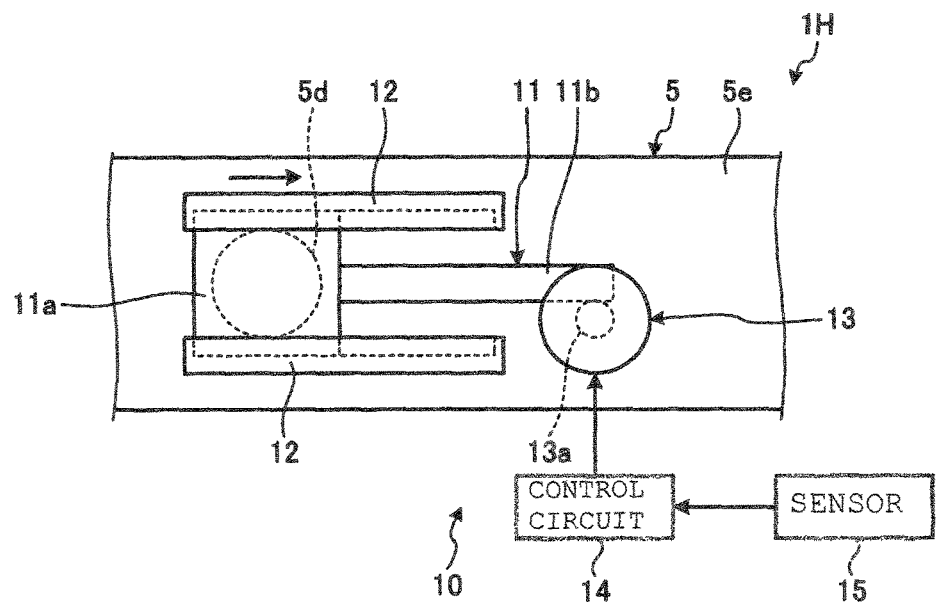
FIG. 17 is a diagram of an aperture portion whose aperture area is changed, provided in a duct employed in an example of a rail vehicle according to a ninth embodiment, showing the condition in which the aperture is closed.
Figure 18:
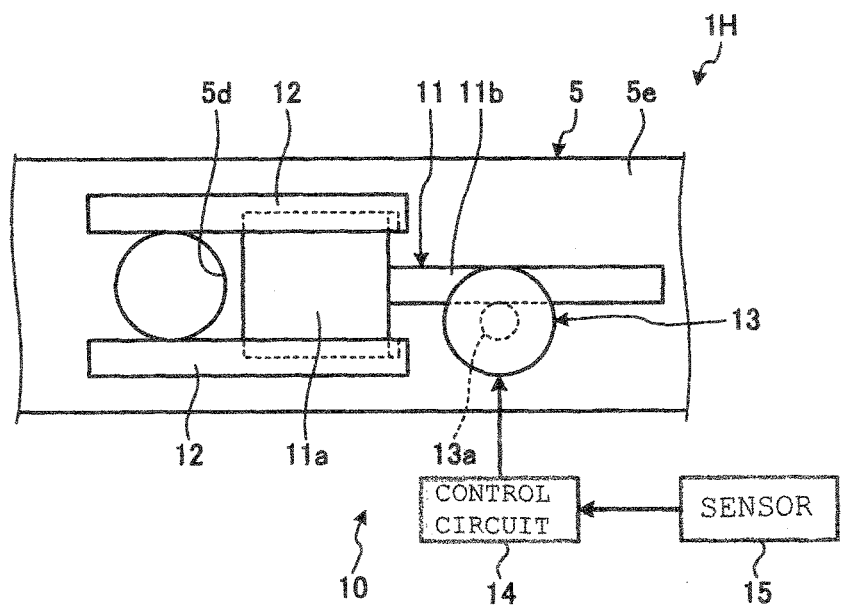
FIG. 18 is a diagram of an aperture portion whose aperture area is changed, provided in a duct employed in an example of a rail vehicle according to the ninth embodiment, showing the condition in which the aperture is open.

A rail vehicle 1H according to this embodiment illustrated in FIGS. 17 and 18 comprises the same construction as the embodiments described above. Consequently, with this embodiment also, the same actions and results (beneficial effects) are obtained as in the case of the aforementioned identical construction. This embodiment differs from the embodiments described above in that the aperture condition of the aperture portion 5d can be set in a variable fashion. Specifically, in this embodiment, as one example, a flow rate control section 10 comprises for example a movable section 11 or guide section 12, drive section 13, control circuit 14 and sensor 15. The movable section 11 is guided in the guide section 12 and is capable of movement between a position (position shown in FIG. 17) in which it covers (blocks) the aperture 5d and a position (position shown in FIG. 18) in which it opens the aperture portion 5d. The movable section 11 comprises a cover 11a and an arm 11b (rack section). The guide section 12 is constituted as a rail that guides the movable section 11 (in this embodiment, as one example, the cover 11a). The drive section 13 can be constituted as a motor having a pinion 13a. The pinion 13a meshes with a rack (not shown) are provided on the arm 11b. In this way, the drive section 13 can alter the position of the cover 11a of the movable section 11 i.e. the aperture area of the aperture portion 5d, by means of the rotational position of the pinion 13a. The control circuit 14 controls rotation of the drive section 13. The sensor 15 is constituted for example as a temperature sensor that detects the temperature within the equipment 3 (housing 3c). The control circuit 14 can for example increase the flow rate of cooled air that is introduced into the equipment 3 (housing 3c) through the aperture portion 5d by increasing the aperture area of the aperture portion 5d, in cases where the temperature of the items of equipment 3, 30 is high. Also, the control circuit 14 can for example decrease the flow rate of cooled air introduced into the equipment 3 (housing 3c) through the aperture portion 5d by decreasing the aperture area of the aperture portion 5d in cases where the temperature within the equipment 3, 30 is low. In this way, with this embodiment, as one example, the temperature and/or humidity within the equipment 3 (housing 3c) can be independently regulated. Also, the temperature and/or humidity within the equipment 3 (housing 3c) can be more finely regulated.

While embodiments of the invention have been described above, these merely represent examples thereof and are not intended to restrict the scope of the invention. These embodiments may be put into practice in various other modes and various deletions, substitutions, combinations or modifications may be performed without departing from the gist of the invention. Such embodiments or modifications thereof are included within the scope or gist of the invention and are included in the invention set out in the patent claims and equivalents thereof. Also, the specification of the various structural elements (such as their construction, type, direction, shape, size, length, width, thickness, height, number, arrangement, position and material) may be suitably altered when these embodiments are put into practice. For example, the present invention may be applied to a compartment in the bonnet portion of a bonnet-type locomotive.

FIELD OF INDUSTRIAL APPLICATION

The present invention may be employed in a rail vehicle that accommodates various items of electrical equipment and the like, in which temperature regulation of these items of equipment and the like is carried out.

What is claimed is:

1. A rail vehicle comprising:
    a plurality of items of equipment provided within a compartment, the compartment having a first side wall and a second side wall that oppose each other and extend in a forward/rearward direction of the rail vehicle;
    an air-conditioner that conditions air flowing within the items of equipment or within a housing that accommodates the items of equipment; and
    a duct system that delivers air between the air-conditioner and the items of equipment, the duct system comprising a delivery duct feeds the air to the items of equipment and a return duct that returns the air to the air-conditioner from the items of equipment;
    wherein the return duct is positioned above the delivery duct;
    wherein the delivery duct comprises (i) a first extension that extends along the forward/rearward direction of the rail vehicle and that is adjacent to the first side wall, and (ii) a second extension that extends along the forward/rearward direction of the rail vehicle and that is adjacent to the second side wall;
    wherein the return duct comprises (i) a first extension that is positioned above the first extension of the delivery duct, extends along the forward/rearward direction of the rail vehicle, and is adjacent to the first side wall, and (ii) a second extension that is positioned above the second extension of the delivery duct, extends along the forward/rearward direction of the rail vehicle, and is adjacent to the second side wall; and
    wherein the first and second extensions of the delivery duct, and the first and second extensions of the return duct, are positioned above a central portion of the compartment in a vertical direction.

2. The rail vehicle according to claim 1, wherein the items of equipment are positioned adjacent to the first side wall or the second side wall of the compartment, and a space is provided in the compartment between the items of equipment that are positioned adjacent to the first side wall and the items of equipment that are positioned adjacent to the second side wall, the space extending along the forward/rearward direction of the rail vehicle.

3. The rail vehicle according to claim 1, wherein the delivery duct further comprises an intermediate section that bridges the first extension and the second extension and that links the first extension the second extension, and
    wherein the return duct further comprises an intermediate section that bridges the first extension and the second extension and that links the first extension the second extension.

4. The rail vehicle according to claim 1, wherein the air-conditioner is shared by the compartment and another compartment which is provided in front or rear of the compartment, and which is divided from the compartment.

5. The rail vehicle according to claim 1, wherein the delivery duct and the return duct are provided with a plurality of aperture-forming-capable sections capable of forming air apertures by excision of a portion of a weakened section.

* * * * *